US007953542B2

(12) United States Patent
Plagge et al.

(10) Patent No.: US 7,953,542 B2
(45) Date of Patent: May 31, 2011

(54) METHOD FOR THE AUTOMATIC DETERMINATION OF THE QUALITY OF A TRANSITION COMPENSATION

(75) Inventors: Frank Plagge, Markgroeningen (DE); Marcus Boumans, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 757 days.

(21) Appl. No.: 11/879,348

(22) Filed: Jul. 16, 2007

(65) Prior Publication Data

US 2008/0221773 A1 Sep. 11, 2008

(30) Foreign Application Priority Data

Jul. 21, 2006 (DE) ......................... 10 2006 033 933

(51) Int. Cl.
*B60T 7/12* (2006.01)
*G06F 19/00* (2006.01)

(52) U.S. Cl. ......................... 701/104; 701/114; 123/492

(58) Field of Classification Search .................. 701/104, 701/109, 110, 103, 114, 115; 123/492, 493
See application file for complete search history.

(56) References Cited

U.S. PATENT DOCUMENTS 5,239,974 A * 8/1993 Ebinger et al. ................ 123/675
5,522,367 A * 6/1996 Reuschenbach et al. ...... 123/492
5,553,593 A * 9/1996 Schnaibel et al. ............ 123/682
6,766,790 B2 * 7/2004 Grass et al. .................... 123/491
6,912,997 B2 * 7/2005 Mezger et al. ................ 123/480
2003/0056774 A1 * 3/2003 Grass et al. .................... 123/686
2004/0045535 A1 * 3/2004 Mezger et al. ................ 123/480

* cited by examiner

*Primary Examiner* — John T Kwon
(74) *Attorney, Agent, or Firm* — Kenyon & Kenyon LLP

(57) ABSTRACT

A computer implemented method and control device for regulating a gasoline engine is provided. A control device automatically records a characteristic of Lambda values and loads a test phase during an operation of the gasoline engine having activated transition compensation. It automatically extracts relevant load changes as a function of the determined characteristics, a load change describing a change from a first load to a second load that differs from the first load. Further, the control device automatically implements a classification of the extracted load changes as a function of specifiable classification criteria and assigns at least one Lambda value to each of the load changes. The control device automatically determines a quality value for each of extracted load changes as a function of a deviation of the at least one assigned Lambda value from a specifiable setpoint Lambda value. The control device also automatically weighs the determined quality values with respect to a classification of the assigned load changes. Still further, the control device automatically determines an overall quality as a function of the weighted quality values using at least one statistical method.

12 Claims, 2 Drawing Sheets

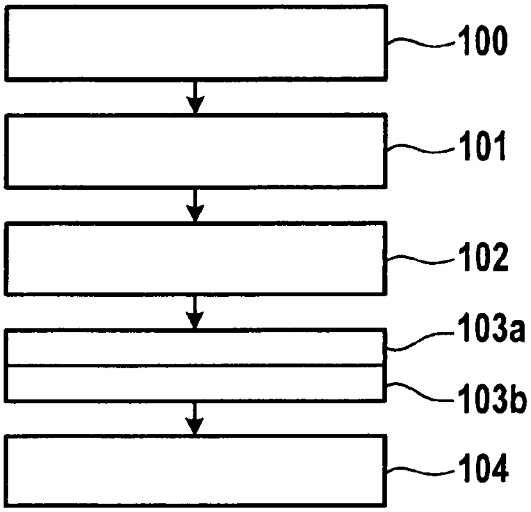
Fig. 3
Fig. 4
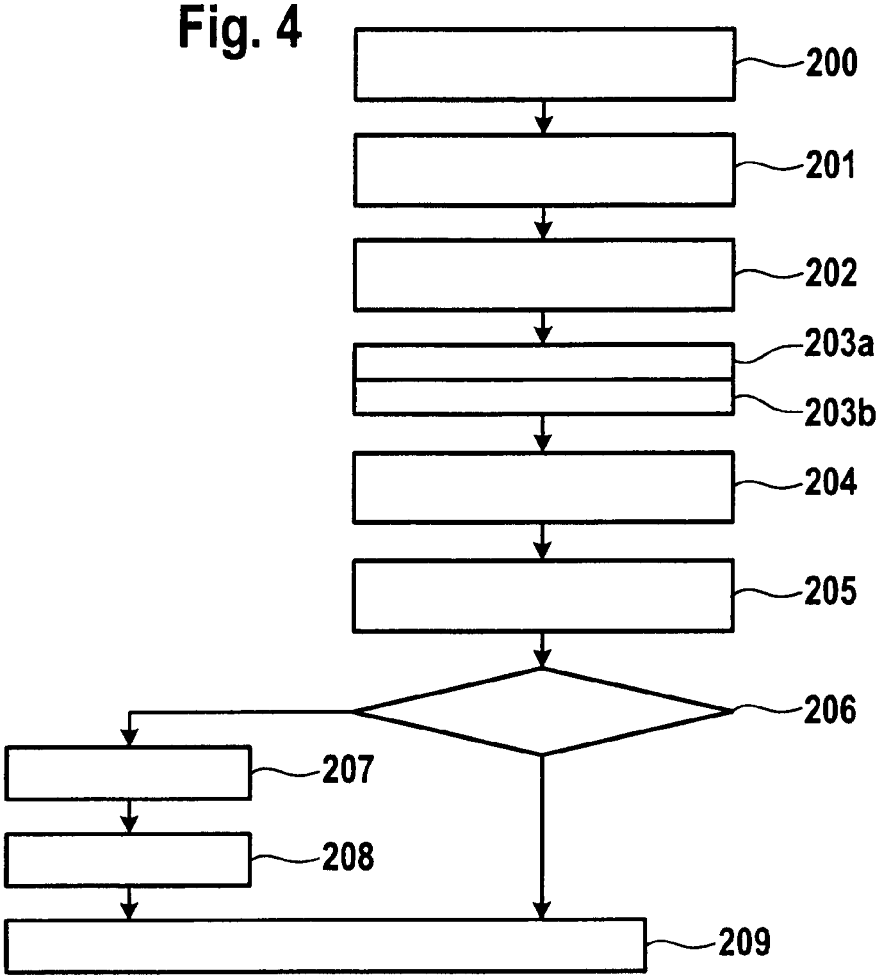

METHOD FOR THE AUTOMATIC DETERMINATION OF THE QUALITY OF A TRANSITION COMPENSATION

FIELD OF THE INVENTION

The present invention relates to a method for the automatic determination of the quality of a transition compensation, the transition compensation bringing about an at least partial compensation of the effects of a wall film effect in a control and regulation of a gasoline engine. The present invention also relates to a control device for controlling and regulating a gasoline engine, the control device including an arrangement for the at least partial compensation of the effect of a wall film effect that influences an operation of the gasoline engine. Furthermore, the present invention relates to a gasoline engine having a control device for controlling and regulating the gasoline engine. Finally, the present invention relates to a computer, in particular a portable computer, as well as a computer program, which is able to run on an computing device, in particular a control device for controlling and regulating a gasoline engine.

BACKGROUND INFORMATION

Conventionally, the air/fuel mixture required for the operation of a gasoline engine is supplied to the gasoline engine via a so-called suction manifold. The formation of the air/fuel mixture frequently takes place within the suction manifold with the aid of one or a plurality of suitable injection valve(s) (so-called manifold injection).

During operation of such, a gasoline engine fuel may deposit on the inner wall of the suction manifold as a function of an instantaneous operating state, this process being referred to as wall film buildup. In another operating state the deposited fuel may then be broken down again, which is referred to as wall film breakdown. The effect of the wall film buildup and wall film breakdown is referred to as wall film effect.

The wall film effect manifests itself especially clearly during load changes. In an increase of the load, denoted as positive load change, the pressure in the suction manifold rises, so that more fuel is deposited on the inner wall of the suction manifold. In a negative load change, i.e., when the load is reduced, the pressure in the suction manifold decreases, which causes the wall film to be broken down.

The control and regulation of the gasoline engine includes, in particular, measures for providing the instantaneously required air-fuel mixture. However, since the air-fuel mixture supplied to the combustion is influenced by wall film effects, the wall film effect occurring during the load change is compensated for by a corresponding functionality of the control device with the aid of a so-called transition compensation, so as to allow an operation of the gasoline engine that is always optimized with regard to the exhaust gas.

The effectiveness of the transition compensation depends on a multitude of factors, such as the quality or the composition of the fuel used at the moment, as well as the type and age of individual components of the gasoline engine, for instance the injection valves. If a transition compensation is applied for the control and regulation of a particular gasoline engine, then the implementer presently checks the effectiveness of the transition compensation based on a few load changes. The implementer then decides whether or not a calibration of the transition compensation is necessary. Following a calibration, the effectiveness of the transition compensation is checked anew, if appropriate, based on individual load changes, and recalibrated. This method is repeated until the effectiveness of the transition compensation is considered sufficient by the implementer.

This method is very time-consuming. Furthermore, the quality of an application generally depends on the implementer's empirical values.

During an application of the transition compensation, load change measurements are performed both on a test stand and also during road operation. In order to check the effectiveness of the transition compensation in as many operating points as possible, the load changes must be monitored at a multitude of different engine temperatures and engine speeds. Observed deviations of the air-fuel mixture (so-called Lambda deviation) are then checked by the implementer and evaluated.

The evaluation is based on the implementer's subjective experience. As a result, the quality of a transition compensation or a calibration is decisively determined by the experience and the subjective evaluation of the implementer. Due to the considerable time and manpower required and the often less than optimal evaluation by the implementer, the transition compensation is often not optimally effective.

SUMMARY

It is an object of the present invention to provide a possibility for achieving a compensation for the wall film effect that is better than conventionally available. Furthermore, it is an object of the present invention to obtain a more reliable evaluation of the quality of a transition compensation. In particular, this is to allow comparability of applied transition compensations with regard to their quality.

In accordance with an example embodiment of the present invention, the characteristic of the Lambda values and the load is recorded automatically in a test phase during operation of the gasoline engine having activated transition compensation. Relevant load changes are automatically extracted as a function of the ascertained characteristics and classified as a function of specifiable criteria. In the process, each load change is automatically assigned at least one Lambda value characteristic, which was determined in the test phase. In particular, the Lambda value characteristic describes an influence of the wall film effect on the air-fuel mixture and the exhaust gases occurring during the load change.

A quality value is automatically determined for each load change extracted as a function of a deviation of the at least one assigned Lambda value from at least one specifiable Lambda value. For instance, the setpoint Lambda value is 1 and thereby characterizes the air-fuel mixture that must be observed for an optimal operation of a three-way catalytic converter used for the catalytic exhaust-gas aftertreatment. The quality value may describe, for example, the difference between the assigned Lambda value and the specifiable setpoint Lambda value.

Each ascertained quality value is then weighted as a function of the implemented classification. Subsequently, an overall quality is calculated from the weighted quality values. At least one statistical method is used for this purpose. The statistical method makes it possible, for example, to calculate a measure of the statistical spread, and thus to describe the frequency and magnitude of the uncompensated effects of the wall film effect in the control and regulation of the gasoline engine having the transition compensation. In particular a variance and a standard deviation are advantageously usable as measure of the statistical spread in this context.

The use of the method of the present invention therefore makes it possible to determine the quality of a transition compensation in an automatic and objective manner.

The test phase advantageously includes the detection of at least one marginal condition, the marginal condition describing a torque demand, a temperature assigned to the gasoline engine, or an engine speed. The quality values are then additionally weighted as a function of at least one of these marginal conditions. In the process, the torque demand is detected with the aid of a pedal travel sensor, for example. It is also possible to read the torque demand out from a functionality for determining a torque path provided in a control device, for example.

The temperature assigned to the gasoline engine may be detected with the aid of a temperature sensor for determining a coolant temperature, for example, or with the aid of a temperature sensor for determining an oil temperature. The engine speed is able to be read out from, for example, a functionality of the control device, or be determined via suitable sensors such as crankshaft sensors and phase detectors, for instance.

A weighting of the quality values as a function of such marginal conditions allows an even further optimized determination of the overall quality. In particular, this makes it possible to weight individual quality values or individual load changes in which a compensation of the wall film effect is implementable only with great difficulties for technical reasons, only very slightly, so that they are able to influence the overall quality only to a very negligible extent. This also makes it possible to weight load changes that occur especially often more highly.

The classification of the extracted load changes is advantageously implemented with regard to a jump direction, a jump magnitude, a level, a magnitude of the Lambda deviation and/or a direction of the Lambda deviation. These classification criteria allow an especially highly resolving classification and thus an especially precise determination of the objective overall quality.

For instance, a jump direction describes whether a change from a low load to a high load—a so-called positive load change—or a change from a high load to a low load—a so-called negative load change—is described. The jump magnitude describes the difference between the first load and the second load. The level may describe the magnitude of the first load or the second load in the form of a percentage, for example. No load would correspond to a load of 0% in this context, and a full load to a load of 100%. The magnitude of the Lambda deviation during a load change may indicate that this load change requires an especially high compensation. The direction of the Lambda deviation indicates in which manner a compensation may be implemented.

A few of the aforementioned classification criteria are implicitly included in the others, or they may advantageously be obtained implicitly when determining another classification criteria. For instance, if the jump magnitude is ascertained from the difference between the first and the second load, then the operational sign (+,−) of the result may indicate the jump direction directly. If the level of the first load and the second load is known, then it is likewise possible to determine the jump magnitude and the jump direction therefrom.

In one advantageous further example method of the present invention, it is automatically detected whether the extracted load changes include a predefined number of possible relevant load changes. The predefined number of possible load changes may include, for instance, all load changes that are possible at all. In particular, however, the predefined number of possible load changes includes load changes that occur especially frequently, or load changes for which a transition compensation is especially difficult to implement, or load changes in which particularly high Lambda deviations occur.

If it is detected in the example method according to the present invention that the predefined number of possible load changes was already checked, then this is able to be indicated. This makes it possible to terminate the test phase. It is especially advantageous here if the measurement or the test phase is terminated automatically.

If it is detected in this advantageous further development that the extracted load changes as yet do not include all load changes of the predefined number, then this may be indicated as well. More specifically, the lack of these load changes may be taken into account in determining the overall quantity, in such a way that the overall quantity is able to be determined as reliably as possible nevertheless.

Using this specific development of the method of the present invention, the evaluation of the quantity is able to be implemented in an especially rapid and comprehensive manner due to the fact that the number of all relevant load changes can be determined in advance and the test phase is implemented until all relevant load changes have been detected or measured. If this is the case, then it may be provided that the test phase is terminated automatically, so that measurements are performed only until all relevant load changes have been detected.

Preferably, a partial quantity is automatically determined for at least one category of load changes, and the deviation of the partial quantity from the overall quantity is determined. This makes it possible, for example, to identify a category of load changes that can be compensated for in an especially satisfactory or in an especially unsatisfactory manner. These load changes are then able to be indicated with the aid of the method according to the present invention. More specifically, this information may be used in a calibration of the transition function. In the process, the calibration may be performed in such a way that, initially, the particular load changes are considered in the calibration in which the wall film effect had been compensated especially poorly up to this point. In this manner an especially rapid and efficient calibration is able to be performed.

If it is determined that one load change or a plurality of the relevant load changes was not measured in the test phase, then an additional measurement may be carried out and the overall quantity be updated automatically with the aid of the measured values thus acquired. The additional measurement is preferably initiated automatically. If the gasoline engine is on a test stand, for example, then the gasoline engine may automatically be controlled by the method according to the present invention to the effect that the load changes still missing will be measured.

The quality values or the overall quantity are preferably determined as a function of a marginal condition or a classification criterion. This makes it possible to obtain even more precise quality values or an even more precise overall quality. The type of consideration of the marginal condition or the classification criterion may result from the statistical method that is used for the process.

The overall quantity is preferably determined with the aid of an expert system, a neural network, or a multi-dimensional characteristics field. The use of a multi-dimensional characteristics field allows an especially rapid determination of the quality values or the overall quality. An expert system makes it possible to represent a particularly vast body of expert knowledge and may thus be used for an especially precise determination of the quality values or the overall quality. In addition to the advantages of the expert system, a neural network offers the advantage of exhibiting a learning behavior by which the determination of the quality values or the overall quality is able to be optimized in an especially convenient manner.

According to an especially advantageous further development of the method of the present invention, a reference quality is determined as a function of the overall quality. For example, the reference quality may correspond directly to the overall quality. An additional measurement may then be carried out while the gasoline engine is being operated. This may be initiated automatically or manually, for example. Using the method of the present invention, an actual quality is then determined as a function of the results of the measurements. This actual quality will then be compared to the reference quality. If the comparison shows a worsening of the transition compensation, then it is possible to determine a correction value in such a way that an improvement is achieved in the transition compensation. This may be checked by a renewed measurement and by determination of the now updated actual quality. The correction value is properly taken into account in the control and regulation of the gasoline engine to this end. This therefore corresponds to a calibration of the transition compensation during normal driving operation.

The correction value is preferably determined during road operation of the gasoline engine and automatically taken into account in the further control and regulation of the gasoline engine. An adaptation is thus able to be implemented, in particular an automatic adaptation of the transition function. Since the wall film effects that occur may vary in response to a modified fuel quality or due to ageing or an exchange of components, for example, an automatic adaptation of the transition compensation is especially advantageous.

The objective is also achieved by a control device for controlling and regulating a gasoline engine, and by a gasoline engine having a control device for controlling and regulating the gasoline engine in that the control device has an arrangement for implementing the method according to the present invention.

The objective is also achieved by a computer in that the computer includes an arrangement for implementing the method according to the present invention. More specifically, the computer may be configured as a portable computer referred to as laptop or notebook.

The computer preferably includes an arrangement for implementing a simulation of a wall film effect. The effect of a transition compensation or a calibration is therefore able to be represented, and possible weaknesses of an instantaneous application may be uncovered in an especially rapid manner.

The objective is also achieved by a computer program of the type mentioned in the introduction in that the computer program is programmed to implement the method according to the present invention when the computer program is running on the computing device, in particular in the control device. Thus, the computer program constitutes the present invention in the same manner as the method for whose execution the computer program is programmed.

BRIEF DESCRIPTION OF THE DRAWINGS

Additional features, possible uses and advantages of the present invention result from the following description of exemplary embodiments of the present invention, which are shown in the figures.

FIG. 3 shows a simplified flow diagram to illustrate aspects of the method according to the present invention.

FIG. 4 shows a schematized flow chart to illustrate a few aspects with regard to a calibration of the transition compensation.

DETAILED DESCRIPTION OF EXAMPLE EMBODIMENTS

Figure 1:
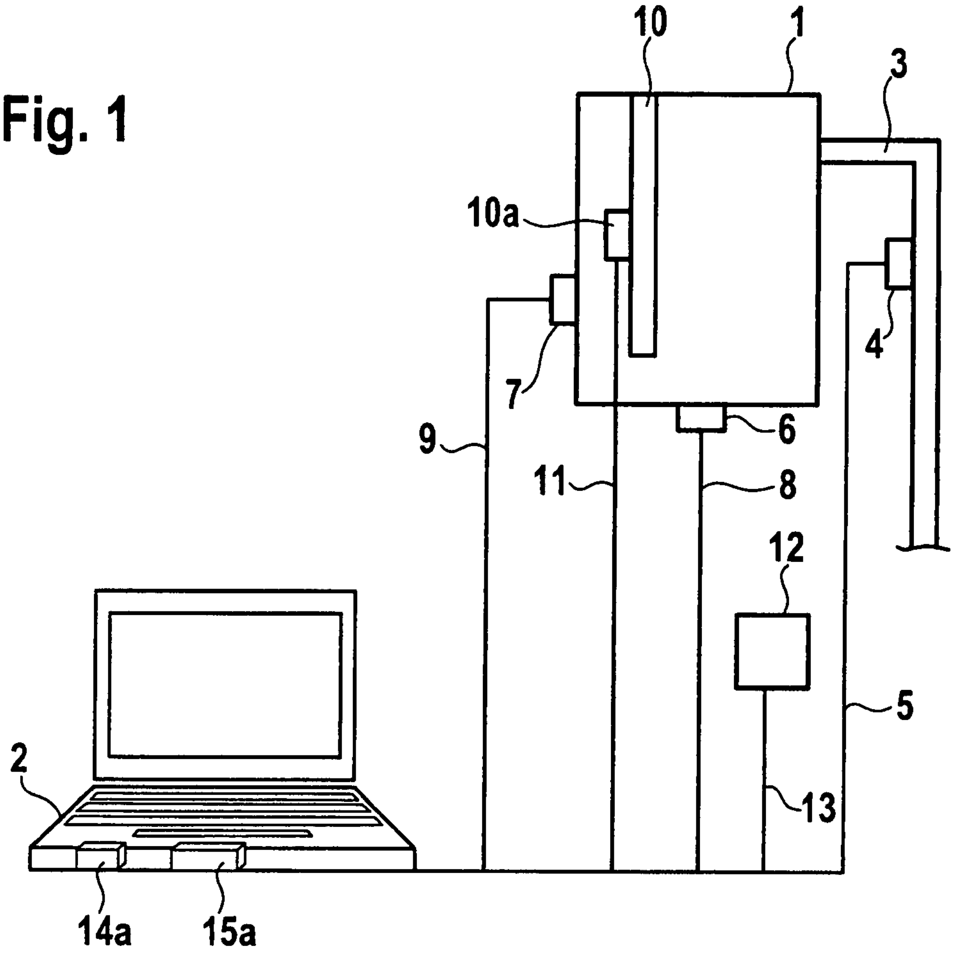
FIG. 1 shows a schematic representation of a gasoline engine during a test phase.

FIG. 1 shows a gasoline engine 1, which is connected to a computer 2. Assigned to gasoline engine 1 is an exhaust system 3, in which a Lambda sensor 4 is disposed. Lambda sensor 4 is connected to computer 2 via a signal line 5.

Furthermore, an engine speed sensor 6 and a temperature sensor 7 are assigned to gasoline engine 1. Engine speed sensor 6 includes, for example, a crankshaft sensor and a phase detector, and is connected to computer 2 with the aid of a signal line 8. Temperature sensor 7 is configured as a cooling water temperature sensor, for example, or as oil temperature sensor and connected to computer 2 with the aid of a signal line 9.

In addition, an intake manifold 10 in which a fuel injector **10*a* is disposed is assigned to gasoline engine 1. Fuel injector 10*a* is connected to computer 2 with the aid of a signal line 11**.

Furthermore, a sensor for detecting a torque demand, which is configured as pedal-travel sensor 12, for example, is shown in FIG. 1. Pedal-travel sensor 12 is connected to computer 2 by means of a signal line 13.

Computer 2 is embodied as portable computer, for instance as laptop or notebook. However, it is also possible that computer 2 is configured as a so-called desktop or as PDA (personal digital assistant). In particular, computer 2 may also be realized as so-called embedded system, which is programmed and optimized for implementing the method according to the present invention by software programming and/or selection of the hardware components. Computer 2 has a processor **14*a* and a memory element 15*a***.

Gasoline engine 1 is set up on a test stand, for example, and controlled and regulated with the aid of computer 2. In the process, the method according to the present invention for determining the overall quality of an applied transition compensation is able to be implemented.

It is also possible that a control device for the control and regulation of gasoline engine 1 is assigned to gasoline engine 1. In this case fuel injector **10*a* could be connected to the control device via signal line 11 and pedal-travel sensor 12 via signal line 13. The control device could then advantageously be connected to computer 2, for instance in such a way that values currently assigned to fuel injector 10*a* or pedal-travel sensor 12** are able to be recorded via an application interface.

More specifically, it is also possible that the functionality of the method according to the present invention running on computer 2 is realized solely by a control device. In this case computer 2 could be dispensed with completely.

Figure 2:
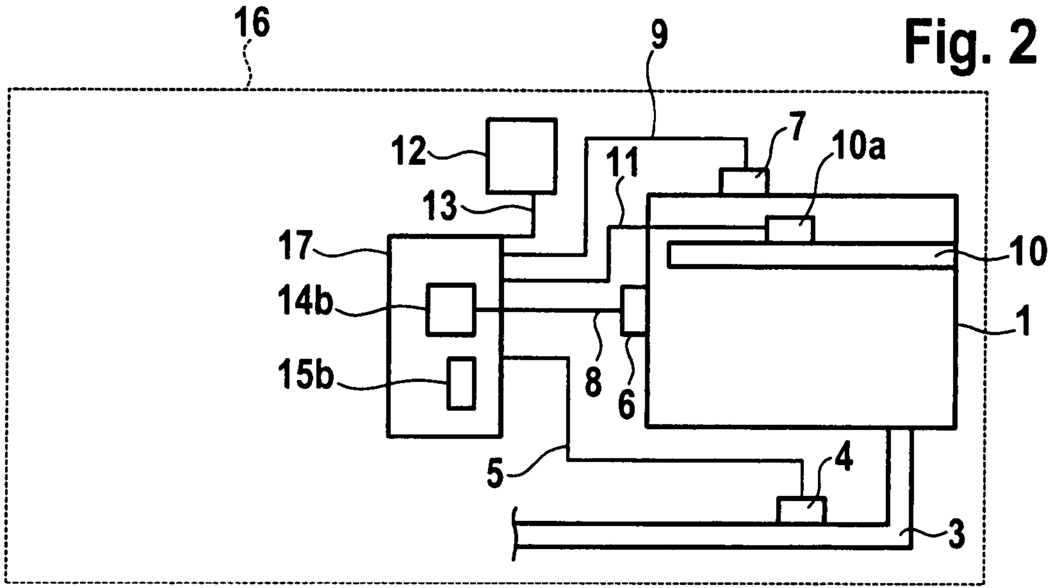
FIG. 2 shows a schematic representation of a gasoline engine disposed in a vehicle, which is suitable for performing a transition compensation or a recalibration of the transition compensation.

FIG. 2 shows a situation where gasoline engine 1 is installed in a vehicle 16. Gasoline engine 1 is controlled and regulated by a control device 17. In particular, control device 17 is programmed to implement a transition compensation. Control device 17 has a processor **14*b* and a memory element 15*b*. Stored in memory element 15*b* is the method according to the present invention, for example, and it is implemented with the aid of processor 14*b***.

If gasoline engine 1 is installed in vehicle 16, then the overall quality is able to be determined in the course of a special test phase. It is also possible to perform measurements during "normal" road operation of vehicle 16 and to store them in memory element 15*b*, for example, with the aid of control device 17. This makes it possible to calculate an overall quality on the one hand, and to read out a reference quality stored in memory element 15*b* on the other, thereby allowing a comparison of an ascertained actual quality with the reference quality. An adaptation of the transition compensation can then be implemented automatically, for instance during operation of gasoline engine 1, as a function of the result of the comparison. To this end, a correction value, in particular, may be ascertained and used as the basis for the further control of gasoline engine 1.

FIG. 3 shows a heavily schematized representation of a possible sequence of the method according to the present invention.

The method begins in a step 100 in which measurements are performed in a test phase during operation of gasoline engine 1. In particular the characteristic of Lambda values and the characteristic of the load are recorded. The characteristic of the Lambda values is determined as a function of the signals, which are transmitted from Lambda sensor 4 via data line 4 to computer 2 or control device 17.

In a step 101, relevant load changes are extracted automatically. A load change may be considered relevant in particular when it causes a wall film effect that is to be compensated for. In merely very small load changes or very long lasting load changes, the wall film effect caused thereby may be so negligible that it will not be taken into account in a transition compensation. Such a load change would not be relevant then and as a result would not be taken into account in the further method. The decision as to whether a load change is considered relevant or irrelevant may be made taking into account quite different criteria or objectives to be achieved. Objectives that are often mutually exclusive for reasons of complexity are, for instance, the most precise quality determination possible on the one hand, and the shortest possible execution time of the method according to the present invention on the other.

In a step 102, a classification of the extracted load changes takes place. Here, a classification is implemented according to the jump direction, jump magnitude, the level, the magnitude of the Lambda deviation, and/or the direction of the Lambda deviation, in particular. The classification may of course be implemented as a function of a random number and combination of the classification criteria. If an especially large number of classification criteria are considered, then an especially nuanced classification is implementable and thus an especially precise overall quantity is able to be determined.

The quality is determined in a step 103. To this end, a quality value for every relevant load change is first ascertained in a step 103*a*. The quality value may describe, in particular, the quality of the transition compensation with regard to this load change. The quality is representable by a decimal number. In one specific embodiment, which is particularly easy to realize, the quality values may correspond to the Lambda deviation.

In a partial step 103*b*, the overall quality is determined from the ascertained quality values. In the process, the quality values are weighted as a function of their classification and, in particular, as a function of marginal conditions. The marginal conditions describe, for example, the instantaneous torque demand or the change in the torque demand during the load change. For instance, this information may be implemented in step 100 by analyzing the signals transmitted from pedal-travel sensor 12 via signal line 13. A weighting may also take place taking a temperature of the gasoline engine into account. This makes it possible to consider different effects of the wall film effect at different temperatures. Furthermore, the weighting may be implemented as a function of an engine speed.

In step 103*b*, the quality values weighted as a function of the marginal conditions is then used to determine the overall quantity with the aid of a statistical or stochastic method. The overall quality may describe an average value of the weighted Lambda deviations, for example. In particular, the overall quality may also describe a variance or standard deviation known from stochastics.

In a step 104, the overall quality is stored as reference value, for example, in memory element 15*b* of control device 17 or in memory element 15*a* of computer 2. Furthermore, it is possible that the characteristics measured in step 104 for determining the overall quality, and the extracted load changes are processed for a graphical display. In particular, it is possible that not detected load changes are represented or that load changes in which the transition compensation has an especially good and/or an especially poor effect, are represented graphically in a suitable manner or combined in a list.

FIG. 4 shows a schematized flow chart of the method according to the present invention while an adaptation of the transition compensation is taking place. Steps 200 to 203*b* correspond to steps 100 to 103*b*. The example method according to the present invention is advantageously executed in control device 17 in this case. However, it is also possible that the method is executed with the aid of a portable computer 2.

In a step 204, the overall quality determined in step 203*b* during operation of gasoline engine 1 in vehicle 16 is stored as actual quality. The reference quality is determined in a step 205. The reference quality may be stored in memory element 15*b*, for instance. It is also possible that the reference quality is stored in memory element 15*a* of computer 2 and forwarded to control device 17 in a suitable manner.

In a step 206, the actual quality is compared to the reference quality. If no deviation results or only a slight deviation, then the method will be terminated in step 209. A new calibration of the transition compensation will not take place, so that gasoline engine 1 is controlled in unchanged form.

However, if it turns out in step 206 that a deviation of the actual quality from the reference quality is present, then a correction value will be determined in a step 207. The correction value is determined in such a way that it allows an improvement in the transition compensation to the effect that it assumes the quality defined by the reference quality, if possible.

In a step 208, the correction value for the further operation of gasoline engine 1 is made available. In a future or in the further control and regulation of gasoline engine 1, this allows a consideration of the instantaneously ascertained correction value.

The example method ends in a step 209 by, for instance, gasoline engine 1 being controlled or regulated on the basis of the corrected transition compensation or by taking the instantaneously ascertained correction value into account.

What is claimed is:

1. A computer implemented method for the automatic determination of a quality of a transition compensation, the transition compensation bringing about an at least partial compensation of the effect of a wall film effect in a control and regulation of a gasoline engine, the method comprising:

a control device automatically recording a characteristic of Lambda values and load in a test phase during an operation of the gasoline engine having activated transition compensation;

the control device automatically extracting relevant load changes as a function of the determined characteristics, a load change describing a change from a first load to a second load that differs from the first load;

the control device automatically implementing a classification of the extracted load changes as a function of specifiable classification criteria, and assigning at least one Lambda value to each of the load changes;

the control device automatically determining a quality value for each of extracted load changes as a function of a deviation of the at least one assigned Lambda value from a specifiable setpoint Lambda value;

the control device automatically weighting the determined quality values with respect to a classification of the assigned load changes; and the control device automatically determining an overall quality as a function of the weighted quality values using at least one statistical method.

2. The method as recited in claim 1, wherein the weighting of the quality values is implemented as a function of at least one marginal condition, the marginal condition describing one of a torque demand, a temperature assigned to the gasoline engine, or an engine speed.

3. The method as recited in claim 1, wherein at least one classification criterion describes at least one of a jump direction by which it is describable whether a load change to be classified is a positive or a negative load change; a jump magnitude by which a difference between first load and second load is describable; a level of the first load; a level of the second load; a magnitude of the Lambda deviation; and a direction of the Lambda deviation.

4. The method as recited in claim 1, further comprising:

automatically detecting whether the extracted load changes encompass a specified quantity of possible relevant load changes, and if the extracted load changes do encompass the specified quantity of possibly relevant load changes, at least one of indicating this, and automatically terminating measurement, and if the extracted load changes do not encompass the specified quantity of possibly relevant load changes, the relevant load changes that are not included are identified and a lack of the identified load changes is taken into account in determining the overall quality, in such a way that a most reliable determination of the overall quality is made possible.

5. The method as recited in claim 1, wherein a partial quantity is automatically determined for at least one category of load changes and the deviation of the partial quantity from the overall quantity determined.

6. The method as recited in claim 1, wherein an additional measurement is carried out and the overall quality is automatically updated with using measured values thus acquired.

7. The method as recited in claim 6, wherein the quality values and the overall quality are determined as a function of at least one of a marginal condition and classification criterion.

8. The method as recited in claim 6, wherein the quality values or the overall quality are determined using at least one of an expert system, a neural network, and a multi-dimensional characteristics field.

9. The method as recited in claim 1, wherein a reference quality is determined as a function of a specific overall quality, an additional measurement is carried out during operation of the gasoline engine, an actual quality is determined as a function of results of the measurement and, if the actual quality falls short of a reference quality, a correction value is determined in such a way that an improvement in the actual quality is achieved when the correction value is taken into account in control and regulation of the gasoline engine.

10. The method as recited in claim 1, wherein the statistical method describes a variance and a standard deviation of a frequency and magnitude of uncompensated effects of the wall film effect.

11. A computer implemented control device for controlling and regulating a gasoline engine, the control device comprising:

an arrangement adapted to at least partially compensate for a wall film effect that influences an operation of the gasoline engine, the control device adopted to perform:

automatically recording a characteristic of Lambda values and load in a test phase during an operation of the gasoline engine having activated transition compensation;

automatically extracting relevant load changes as a function of the determined characteristics, a load change describing a change from a first load to a second load that differs from the first load;

automatically implementing a classification of the extracted load changes as a function of specifiable classification criteria, and assigning at least one Lambda value to each of the load changes;

automatically determining a quality value for each of extracted load changes as a function of a deviation of the at least one assigned Lambda value from a specifiable setpoint Lambda value;

automatically weighting the determined quality values with respect to a classification of the assigned load changes; and automatically determining an overall quality as a function of the weighted quality values using at least one statistical method.

12. The computer implemented control device of claim 11, wherein the statistical method describes a variance and a standard deviation of a frequency and magnitude of uncompensated effects of the wall film effect.

* * * * *